US010569188B2

(12) United States Patent
Lehmann

(10) Patent No.: US 10,569,188 B2
(45) Date of Patent: Feb. 25, 2020

(54) LOW-TEMPERATURE DISTILLATION PLANT

(71) Applicant: THERMAL PURIFICATION TECHNOLOGIES LTD, Buchs (CH)

(72) Inventor: Markus Lehmann, Wohlen (CH)

(73) Assignee: Thermal Purification Technologies Limited, Buchs (CH)

( * ) Notice: Subject to any disclaimer, the term of this patent is extended or adjusted under 35 U.S.C. 154(b) by 0 days.

(21) Appl. No.: 16/069,367

(22) PCT Filed: Jan. 9, 2017

(86) PCT No.: PCT/EP2017/050346
§ 371 (c)(1),
(2) Date: Jul. 11, 2018

(87) PCT Pub. No.: WO2017/121703
PCT Pub. Date: Jul. 20, 2017

(65) Prior Publication Data
US 2019/0054392 A1 Feb. 21, 2019

(30) Foreign Application Priority Data

Jan. 12, 2016 (CH) .................................. 0041/16

(51) Int. Cl.
B01D 3/06 (2006.01)
B01D 1/16 (2006.01)
(Continued)

(52) U.S. Cl.
CPC ............... B01D 3/065 (2013.01); B01D 1/16 (2013.01); B01D 1/26 (2013.01); B01D 1/289 (2013.01);
(Continued)

(58) Field of Classification Search
CPC .... B01D 3/007; B01D 5/0027; B01D 5/0036; B01D 5/0039; B01D 5/006; B01D 3/065;
(Continued)

(56) References Cited

U.S. PATENT DOCUMENTS 4,770,005 A * 9/1988 Alefeld ..................... C02F 1/04
261/128
8,617,359 B2 12/2013 Lehmann et al.
(Continued)

FOREIGN PATENT DOCUMENTS

CA WO2015048878 A1 * 9/2015 ............... B01D 5/00
FR 2869307 B1 * 4/2004 ........... B01D 1/2884
(Continued)

OTHER PUBLICATIONS

FR2869307B1_ENG (WIPO Patentscope machine translation of Baujat) (Year: 2004).*
(Continued)

Primary Examiner — Youngsul Jeong
Assistant Examiner — Gabriel E Gitman
(74) Attorney, Agent, or Firm — Dority & Manning, P.A.

(57) ABSTRACT

A low-temperature distillation facility for distilling a mixed fluid into a pure fluid. An aggregation device has an inlet connected to the vapour space of a supercooling chamber, wherein captured mixed fluid from an evaporator enters the supercooling chamber. The aggregation device's outlet is connected to the vapour space of a superheating chamber, wherein captured pure fluid from a condenser can be sprayed into the superheating chamber. An energy source cools the temperature in the supercooling chamber and heats the temperature in the superheating chamber. A heat exchanger is arranged between the exits of the supercooling chamber and of the superheating chamber. During the process, vapour flows from the supercooling chamber via the aggregation device to the superheating chamber.

16 Claims, 4 Drawing Sheets

(51) Int. Cl.
- *B01D 1/26* (2006.01)
- *B01D 3/00* (2006.01)
- *B01D 5/00* (2006.01)
- *C02F 1/04* (2006.01)
- *B01D 1/28* (2006.01)
- *C02F 1/12* (2006.01)

(52) U.S. Cl.
CPC ............. *B01D 3/007* (2013.01); *B01D 5/006* (2013.01); *B01D 5/0027* (2013.01); *B01D 5/0036* (2013.01); *B01D 5/0039* (2013.01); *C02F 1/041* (2013.01); *C02F 1/12* (2013.01); *C02F 2303/10* (2013.01)

(58) Field of Classification Search
CPC .. B01D 1/16; B01D 1/26; B01D 1/289; C02F 1/041; C02F 1/12; C02F 2303/10
See application file for complete search history.

(56) References Cited

U.S. PATENT DOCUMENTS

| | | |
|---|---|---|
| 2010/0115789 A1 | 5/2010 | Lehmann |
| 2010/0163398 A1 | 7/2010 | Lehmann et al. |
| 2012/0119396 A1* | 5/2012 | Saha .................. C02F 1/04 261/128 |
| 2013/0341177 A1* | 12/2013 | Ng .................. B01D 1/065 203/10 |
| 2016/0251235 A1 | 9/2016 | Shahsavar et al. |
| 2017/0007942 A1 | 1/2017 | Hardiman |

FOREIGN PATENT DOCUMENTS

| | | |
|---|---|---|
| WO | WO 2008/122136 | 10/2008 |
| WO | WO 2008/122137 | 10/2008 |
| WO | WO 2012/156646 | 11/2012 |
| WO | WO 2015/048878 | 4/2015 |
| WO | WO 2015/114342 | 8/2015 |

OTHER PUBLICATIONS

Wang et al., Thermoeconomic analysis of a low-temperature multi-effect thermal desalination system coupled with an absorption heat pump. Energy, 36(6), 3878-3887 (Year: 2011).*

El-Dessouky et al., Chapter 5: Multiple Effect Evaporation Vapor Compression, Fundamentals of salt water desalination. Elsevier. p. 263-269 (Year: 2002).*

International Search Report (PCT/EP2017/050346), dated Feb. 13, 2017.

* cited by examiner

LOW-TEMPERATURE DISTILLATION PLANT

CROSS-REFERENCE TO RELATED APPLICATIONS

This application claims priority to International Application Serial No. PCT/EP2017/050346, filed Jan. 9, 2017, which claims priority to Swiss Application No. 0004/16, filed Jan. 12, 2016. International Application Serial No. PCT/EP2017/050346 is hereby incorporated herein in its entirety for all purposes by this reference.

FIELD OF THE INVENTION

The invention relates to a low-temperature distillation facility (LTD) with one or more stages having different mean temperatures $T_i$, for distilling a mixed fluid into a pure fluid, wherein each stage comprises an evaporator with a vapour space and with a warmer $Ti+\Delta T$ mixed fluid which can be brought in, as well as a condenser with a vapour space and with a cooler $T_i-\Delta T$ pure fluid which can be sprayed in. The vapour spaces of the evaporator and of the condenser are connected to one another into a common vapour space by way of vapour connections, in a manner such that the pressure and the temperature therein can equalise at all times in an unhindered manner.

BACKGROUND

Distillation facilities are used for purifying water, but not only water. Thereby for example, clean purified water is obtained from water contaminated with salts or impurities, termed here as mixed water, by way of the mixed water evaporating amid the input of heat and subsequently being condensed again. What remains is a brine or thickened (concentrated) mixed water with a high share of impurities.

A so-called low-temperature distillation (LTD) facility is described in U.S. Pat. No. 8,617,359, which is hereby incorporated herein by this reference for all purposes, and this is characterised in that the energy requirement is much lower than with conventional facilities. This is achieved by way of the vapour spaces of the evaporator and condenser being connected into a common vapour space, in a manner such that the pressure and the temperature can propagate therein in an unhindered manner at all times. The mixed fluid which is brought into the vapour space at the evaporator side at $T_i+\Delta T$ is only a few degrees ($\Delta T$ is about 0.5-4° C.) warmer than the pure fluid which is sprayed into the vapour space at the condenser side, wherein the pressure $P_i$ in the vapour space corresponds to the saturation vapour pressure at the mean temperature $T_i$ between the mixed fluid and the pure fluid. The somewhat cooler, injected pure fluid inevitably causes the condensation of the vapour arising from the somewhat warmer mixed fluid due to evaporation. The vapour from the evaporator condenses in the condenser, on the fine, cooler droplets of the sprayed-in fluid, and these droplets are finally captured there. The captured fluids in the evaporator and in the condenser have the mentioned mean temperature $T_i$. What is important is that non-condensable gases are sucked out of the condenser at the end of the condensation path, since they unfavourably influence the pressure in the vapour space and slow down the process. A temperature and pressure monitoring in the vapour space economically [closed-loop] controls this suctioning.

A multi-staged method, with which several stages of different mean temperatures are successively arranged, is also specified in the mentioned document. Thus as a whole, a larger temperature drop which is available for example as waste heat of an existing industrial facility, can be utilised.

The clean or pure fluid is cooled before the entry into the condenser, and the mixed fluid is heated before entry into the evaporator, in order to achieve the correct starting temperatures. Even if the temperatures in the chambers are optimised to the extent that a cooling of the one fluid can be utilised for the simultaneous heating of another fluid by way of heat exchangers, however energy is always absent, in order to create a starting temperature which is increased at one side, which is to say a difference $\Delta T$ of the starting temperatures.

One constantly strives to reduce the energy expense when operating such a facility. In a multi-stage LTD facility, energy is required on the one hand, in order to transport the fluids to the evaporators or condensers of the next stage and to subject them to the necessary pressure, as well as to suction away the non-condensable gases. An optimisation concerning this aspect is not the object of the present invention.

On the other hand, energy is required, in order to heat or cool the fluids to the necessary temperatures. Many LTD facilities are operated in the proximity of industrial facilities producing waste heat which otherwise cannot be utilised further. Such industrial facilities, for example power stations, are often constructed on rivers or at other expanses of waters, whose temperatures noticeably increase due to the cooling of the industrial facility, which is often undesirable. In particular, waste heat of less than 100° C. cannot often be meaningfully which is to say economically utilised and thus burdens the environment. Fortunately, the LTD is extremely suitable for the application of such low temperatures, by which means the operating costs of the LTD facilities can turn out to be quite low thanks to the utilisation of such waste heat.

However, facilities for distilling fluid are also required at locations, at which no waste heat is available. In these cases, the costs for the energy required for reaching the respectively demanded temperature of the fluids are thus part of the operating costs.

A facility which for the most part is constructed equally to that described in U.S. Pat. No. 8,617,359, is described in US Patent Application Publication 2016/0251235A1, which is hereby incorporated herein by this reference for all purposes. The two fluids, clean and contaminated water, are pumped away out of their reservoirs at the ambient temperatures and are brought to the necessary, different temperatures in two heat exchangers, for producing or maintaining these necessary starting temperatures. The heat exchangers are operated with a circulating temperature regulating fluid in a separate circuit, and this fluid is in each case is heated or cooled amid the application of a compressor and a valve. The disadvantage of this arrangement is the fact that such a facility operates in a very energy-intensive manner.

A multi-stage distillation method which likewise operates according to the principle mentioned above is described in US Patent Application Publication 2017/0007942A1, which is hereby incorporated herein by this reference for all purposes. Each evaporator stage is vapour-connected to a corresponding condenser stage, wherein the condenser circuit circulates oppositely to the evaporator circuit in the case of a multi-stage method. Here too, thermal energy is brought from the clean water of the discharge of the warmest condenser stage into the impure water from the discharge of the coolest condenser stage, in a heat exchanger, at the end of the distillation method. The thermal input which yet additionally needs to be brought into the system for this, is effected in a second circuit with a heat exchanger and which is supplied by an energy source and has an additional fluid. There, the impure water is heated further, until it has the correct temperature, so as to be introduced again into the first, hottest evaporator. This additional energy is roughly the same amount as with the last described method. Fans which assist in the transport of vapour from the vapour spaces of the evaporator into those of the condensers are attached in the connections of vapour spaces of all stages. These have the disadvantageous effect that they are at odds with the optimal process conditions, by which means the process is slowed down in all chambers.

A further distillation method of this type is described in WO 2012/156646. Here too, the supply of energy is effected by a heat source which heats the contaminated fluid, before this is let into the evaporator. Here, a gas flow from the condenser to the evaporator and which must be driven by a fan is provided, additionally to the gas flow from the evaporator to the condenser, said latter gas flow being usual for the process. The disadvantage with this is evidently the fact that the already clean vapour is mixed again with the impure fluid and condenses at least partly by way of this. This increases the energy requirement and slows down the distillation process. The necessary heat for producing the hot mixed fluids is achieved by way of heaters.

BRIEF SUMMARY OF THE INVENTION

It is the object of the present invention, to improve an LTD facility of the initially described type according to the state of the art, to the extent that its energy requirement for maintaining the temperature of the fluids at the respectively required temperatures is reduced.

This object is achieved as described below. The LTD facility according to the invention comprises an LTD facility according to the state of the art, additionally comprising at least one aggregation device, a supercooling chamber, a superheating chamber as well as a heat exchanger, wherein these components are connected in the LTD facility as follows: the aggregation device at the entry side is connected to the vapour space of a supercooling chamber, wherein captured mixed fluid from an evaporator, with several evaporators from that of the coolest stage, can be brought into the supercooling chamber. At the exit side, the aggregation device is connected to the vapour space of a superheating chamber, wherein captured pure fluid from a condenser, with several condensers from that of the warmest stage, can be sprayed into the superheating chamber. Moreover, the aggregation device is connected to an energy source, for cooling the temperature in the supercooling chamber and for heating the temperature in the superheating chamber. Vapour flows from the supercooling chamber to the superheating chamber via the aggregation device during the process. The heat exchanger is arranged between the exits of the supercooling chamber and of the superheating chamber, for cooling the hot captured pure fluid from the superheating chamber, as the entry into the condenser, with several condensers into that of the coolest stage, as well as for heating the cold, captured mixed fluid from the supercooling chamber, as the entry into an evaporator, with several evaporators into that of the warmest stage.

The idea, on which the invention is based, lies in the LTD facility, according to the invention, comprising an aggregation device which produces the desired temperature difference which is required between the coldest condenser and the warmest evaporator. For this, the respective, captured fluids are taken from the coolest evaporator and from the warmest condenser and cooled and heated respectively, to an even greater extent. The already cooled mixed fluid is cooled further in the supercooling chamber and the already heated pure fluid is heated further in the superheating chamber. The supercooling chamber as well as the superheating chamber, with their respective vapour spaces is vapour-connected to the aggregation device, which for its part can be designed in different manners. In particular, the aggregation device can comprise one or more sorption chambers or produce the temperature difference by way of a jet nozzle or a compressor and a vacuum pump respectively. The vapour which has flowed out of the supercooling chamber into the aggregation device in the meanwhile can change its aggregation condition there, before it flows out of the aggregation device again in the form of vapour, into the superheating chamber and is condensed anew there.

Cold mixed fluid and hot pure fluid are now available in the capture containers of the supercooling chamber and of the super heating chamber. However, hot mixed fluid and cold pure fluid are required as inputs into the LTD facility. For this reason, a heat exchanger with a counter-flow device is arranged between the fluid exits of the supercooling chamber and of the superheating chamber, so that the waste heat can be released from the hot, pure fluid onto the cold mixed fluid, so that the necessary temperatures of the respective fluids are achieved.

In a further contrast to the facilities according to the state of the art, the required energy is fed to the system in a vapour conduit and not in a fluid conduit. The aggregation device which is responsible for the energy feed in this vapour conduit produces the temperature difference between the vapour spaces of the supercooling chamber and the superheating chamber in a direct manner and operates at a high efficiency.

Facilities according to the state of the art in each case require an energy source which heats the impure which is to say contaminated fluid to the required temperature before the entry into the first which is to say hottest evaporator. In the mentioned facilities, this is effected by way of circulating fluid in a heat exchanger, said fluid dissipating its heat to the impure fluid, or by way of heaters. The efficiency of such heater exchangers however is relatively low.

BRIEF DESCRIPTION OF THE DRAWINGS

The invention is hereinafter explained in more detail with reference to the drawings. There are shown in.

DESCRIPTION OF EXEMPLARY EMBODIMENTS OF THE INVENTION

Figure 1A:
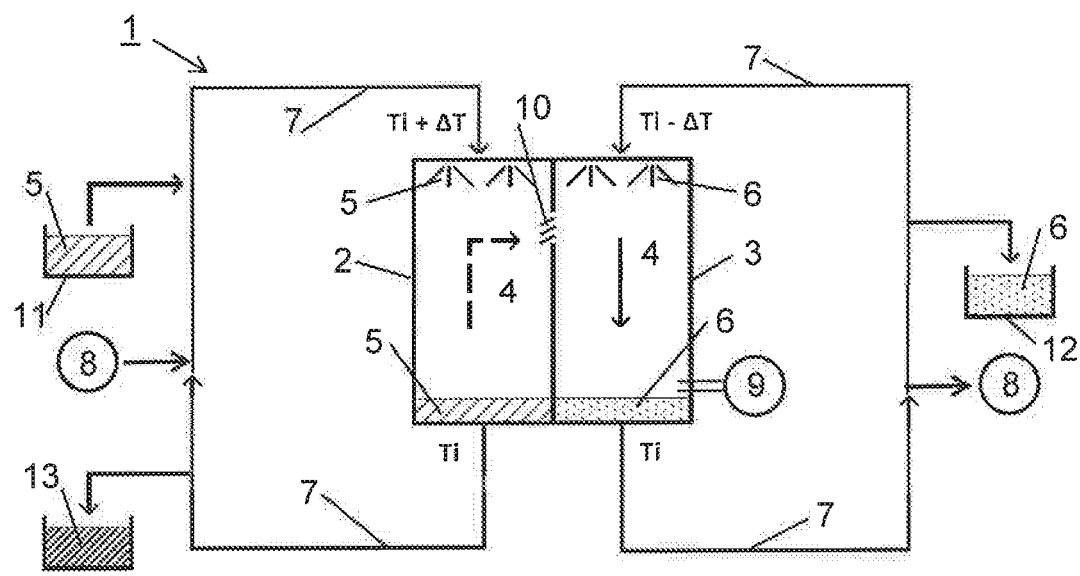
FIGS. 1a, b a schematic representation of a low-temperature distillation facility (LTD facility) according to the state of the art: a) in the simplest embodiment; b) multi-staged.

FIG. 1a shows a schematic representation of a low-temperature distillation facility (LTD facility) 1 according to the state of the art, in its simplest embodiment with only one stage. It comprises an evaporator 2 with a vapour space 4, into which mixed fluid 5 which is to be distilled can be introduced, so as to evaporate. Non-evaporated mixed fluid 5 is also captured again in the evaporator 2. The LTD facility moreover comprises a condenser 3 with a vapour space 4, into which pure fluid 6 corresponding to the distillate of the mixed fluid 5 can be sprayed, in order to form the smallest of droplets, on which vapour can condense. These droplets are finally captured again in the condenser 3, as a pure fluid 6. The vapour spaces 4 of the evaporator 2 and the condenser 3 in each case are connected to one another into a common vapour space 4 by way of a vapour connection 10, in a manner such that the pressure and the temperature can propagate therein at all times in an unhindered manner. The common vapour space 4 thus connects to the evaporator 2 to the condenser 3.

In the representation according to FIG. 1, both fluids, 5, 6 are sprayed into the vapour space 4, wherein the mixed fluid 5 at $T_i + \Delta T$ is a few degrees warmer than the pure fluid 6 at $T_i - \Delta T$. The pressure in the vapour space 4 thereby corresponds to the saturation pressure Pi at the mean temperature $T_i$ of the two fluids 5, 6. Due to the physical conditions in the vapour space 4, the mixed fluid 5 evaporates and propagates into the condenser region of the vapour space 4. There, the vapour comes into contact with the finely sprayed, cooler droplets of the pure fluid 6, condenses thereon, falls and is finally captured at the base of the condenser 3. The non-evaporated mixed fluid 5 likewise falls and is captured at the base of the evaporator 2. The temperatures of the captured fluids 5, 6 are roughly the same and correspond to the mean temperature $T_1$ of their initial temperatures. Conduits 7 then remove the captured fluid 5, 6 to and from which fluids heat is respectively fed and dissipated by way of an energy source and heat sink respectively, in order to heat the mixed liquid again to $T + \Delta T$ and to cool the pure fluid 6 again to $T - \Delta T$. The temperature-managed fluids 5, 6 in conduits 7 are then brought again into the evaporator 2 and sprayed into the condenser 3 respectively. Thus two circuits arise, an evaporator circuit and a condenser circuit.

The process runs in a continuous manner. A supply container 11 with mixed fluid 5 ensures the resupply, and the recovered which is to say extracted pure fluid 6 can be delivered as distillate into an end-container 12, and brine or thickened/concentrated mixed fluid 13 which has a greater share of salts or unwanted substances or contaminants than the mixed fluid 5 from the supply container 11, is removed from the evaporator circuit. As the case may be, gases which cannot be condensed must be sucked out of the condenser 3 by way of a suction device 9, at the end of the condensation path, so that the process runs in an optimal manner.

Figure 1B:
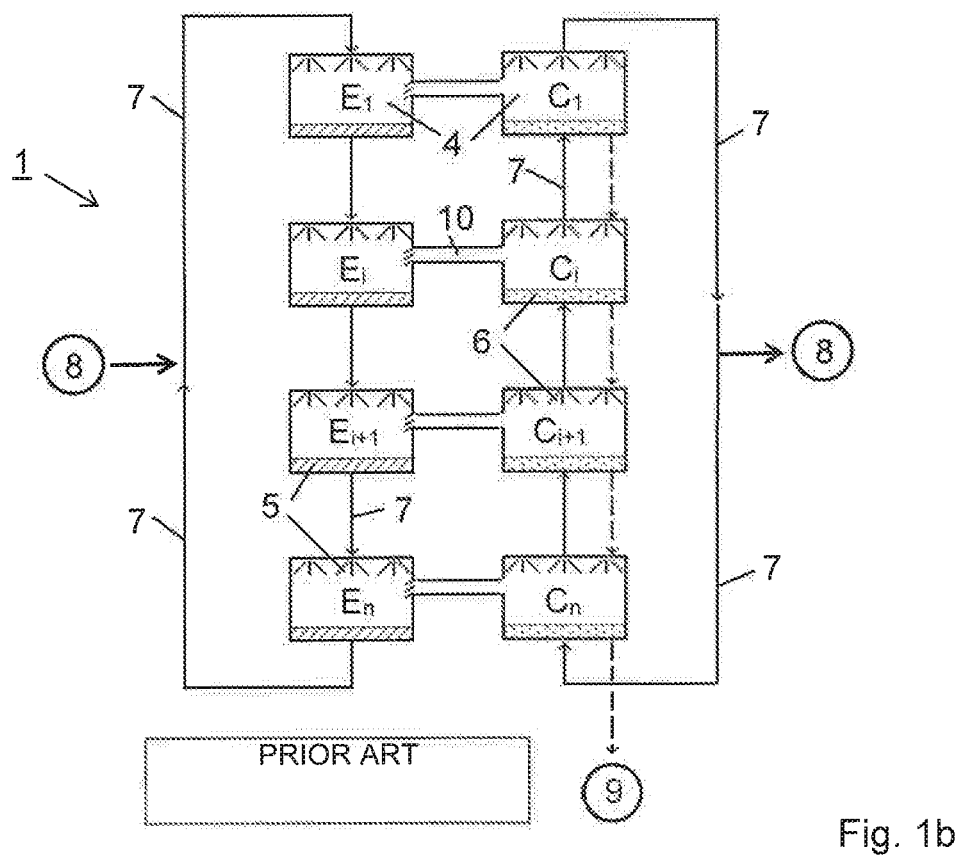

FIG. 1b shows an LTD facility 1 with several, for example n stages, wherein in this figure n=4. It comprises n pairs of evaporators 2 and condensers 3, which are indicated here at $E_1, \ldots, E_n$ and $C_1, C_n$ respectively, each with different mean temperatures $T_i$, i=1, 2, ... n. The evaporator circuit begins at the hottest stage $E_1$, whereafter each conduit 7 brings mixed fluid out of an evaporator $E_i$ to the evaporator $E_{i+1}$ of the next cooler stage, in order to be brought or sprayed in there. The mixed fluid 5 from the coolest evaporator $E_n$ is subsequently heated by an energy source 8 and is again brought or spayed into the warmest evaporator $E_1$. The condenser circuit runs counter to the evaporator circuit. The condenser circuit begins at the coolest stage $C_n$, whereupon each conduit brings pure fluid 6 out of the condenser $C_i$ to the condenser $C_{i-1}$ of the next warmer stage, in order to be spayed in there. One has forgone the representation of the conduits 7 to the spray-in nozzles and away from the capture containers in the figure, for the purpose of a better overview. The pure fluid 6 from the warmest condenser $C_1$ is subsequently cooled by way of a heat sink 8 and is again sprayed into the coolest condenser $C_n$.

In the functional schematic representation of FIG. 1b, the dashed line leading to the suction device 9 schematically indicates the suction of non-condensable wises at the end of one or several condensation paths by the suction device 9.

Figure 2:
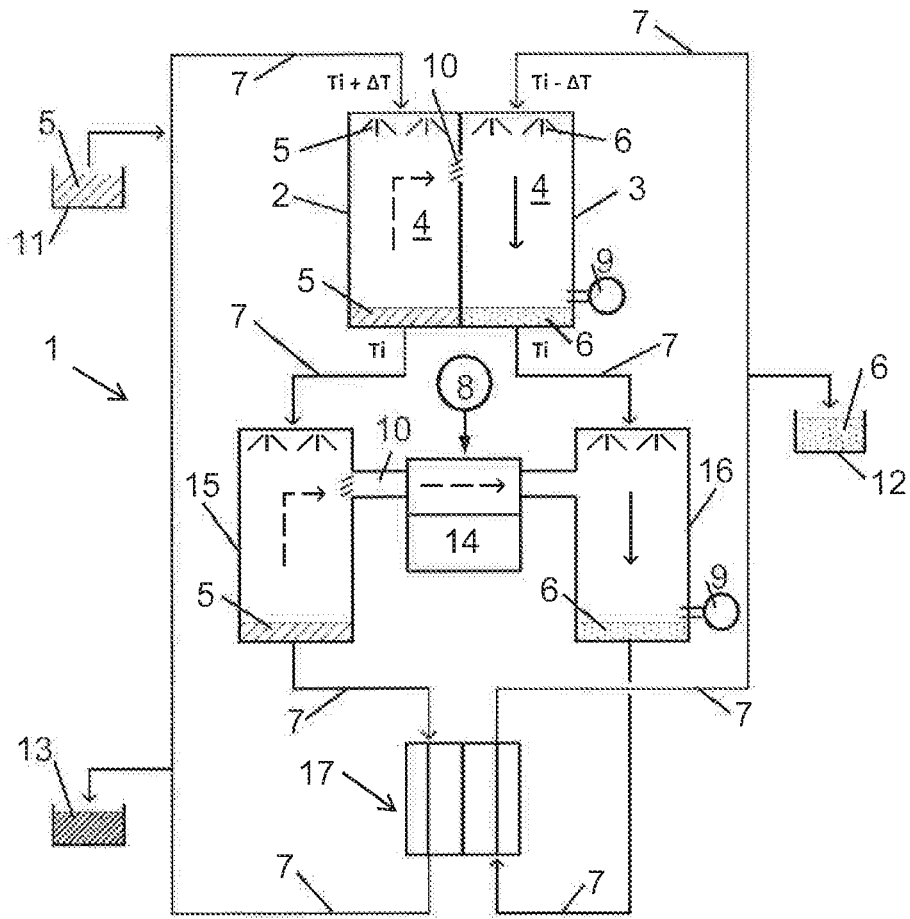
FIG. 2 a schematic representation of an LTD facility according to the invention, in its simplest form.

A simple, single-stage embodiment of the LTD facility 1 according to the invention is represented in FIG. 2. The basic distillation process again runs in the same manner as that according to the state of the art. The reference numerals in each case represent the same components.

The LTD facility 1 according to the invention and of the simplest type comprises only one stage with a mean temperature $T_i$, for distilling a mixed fluid 5 into a pure fluid 6. It comprises an evaporator 2 with a mixed fluid 5 which can be brought in and which is warmer by $\Delta T$, and condenser 3 with a fluid 6 which can be sprayed in and is cooler by $\Delta T$, as well as vapour spaces 4 which are connected to one another by a vapour connection 10 and in which the pressure and temperature of the evaporator and condenser can equalise in an unhindered manner at all times. Conduits 7 form an evaporator circuit and a condenser circuit, as described with regard to the design according to the state of the art The essential difference of the facility according to the invention compared to an LTD facility 1 according to the state of the art lies in the energy source 8 and the heat sink 8 being replaced by other components which are connected to one another. An aggregation device 14 forms the core of the LTD facility according to the invention, surrounded by a supercooling chamber 15, a superheating chamber 16 and a heat exchanger 17. The aggregation device 14 at the entry side is connected to the vapour space of the supercooling chamber 15, wherein captured mixed fluid 5 can be brought from the evaporator 2 into the supercooling chamber 15. At the exit side, this device is connected to the vapour space of the superheating chamber 16, wherein captured pure fluid from the condenser 3 can be sprayed into the superheating chamber 16. In contrast to the conduits 7, in which fluid flows, these connections are vapour connections 10 which are accordingly designed with a large diameter, in order to ensure a good pressure equalisation to the aggregation device 14. Additionally to the actual distillation facility, vapour flows in these vapour connections 10, from the supercooling chamber 15 via the aggregation device 14 to the superheating chamber 16, in which the vapour is condensed again. The aggregation device 14 is connected to an energy source 8 and ensures the cooling of the temperature in the supercooling chamber 15 and the heating of the temperature in the superheating chamber 16.

A heat exchanger 17 is arranged between the exits of the supercooling chamber 15 and of the superheating chamber. It ensures the cooling of the hot, captured pure fluid 6 from the superheating chamber 16, said fluid being led in a manner cooled by conduits 7, to the entry into the condenser 3. The heat exchanger 17 moreover ensures the heating of the cold, captured mixed fluid 5 from the supercooling chamber 17, said fluid being led in a manner heated by the conduits 7, to the entry into the evaporator 2.

The conduits 7 in the heat exchanger 17 run in opposite directions, so that a maximal temperature exchange of the two fluids 5, 6 is rendered possible.

The advantage of the present invention lies in the fact that as a whole, less energy needs to be supplied from the outside, and also less heat needs to be dissipated, in order to achieve the necessary temperature difference of (n+1)·ΔT, wherein n indicates the number of stages in the case of multi-stage facilities. The energy source 8 and the heat sink 8 of the state of the art and for cooling and heating the fluids have been brought together for this, by which means heat is recovered or led back into the process. A greater productivity also results due to the fact that vapour from the evaporator circuit is additionally brought into the condenser circuit via the aggregation device 14.

It is to be noted that the construction of an evaporator 2, of a condenser 3, of a supercooling chamber 15 and of a superheating chamber 16 in principle can be identical. The fluids 5, 6 can be sprayed in with all embodiments. Moreover, each of the mentioned chambers 2, 3, 15, 16 comprises a vapour space 4 and a lower capture container for capturing the introduced fluids, an upper feed conduit 7 to the spray-in facility, a lower discharge conduit 7 out of the capture container, and a vapour connection 10 to or out of the vapour space, as a connection to another vapour space 4 or to the aggregation device 14. Alternatively, for this, the mixed fluid 5 can be brought into an evaporator 2 or into the supercooling chamber, in another manner and spraying in is not absolutely necessary. On the other hand, the harmonisation of the chambers 2, 3, 15, 16 simplifies the LTD facility 1 according to the invention.

In a preferred embodiment of the invention, the aggregation device 14 comprises at least one sorption chamber 18 and/or desorption chamber 19, with a sorbent 20. The term sorption is to be understood as any type of receiving of a substance at the surface of another substance or in another substance, the so-called sorbent. In particular, the term sorption includes the adsorption, which is the receiving on solid matter, as well as absorption which is the receiving by a fluid. Desorption describes the reverse process of sorption and again releases the sorbed substance. Whereas a sorption takes heat from the substance to be received, desorption returns likewise just as much heat to the released substance. Accordingly, these processes permit the creation of a large temperature difference between the starting substance and the end substance, which is desirable in the present case.

Thereby, vapour from the vapour space of the supercooling chamber can be sorbed in the sorbent 20 and vapour can be desorbed out of the sorbent 20 whilst inputting energy 8, said vapour finally being able to be fed into the vapour space 4 of the superheating chamber 16. A sorption can firstly be carried out with such a device, wherein only the vapour connection 10 to the supercooling chamber 15 is open, until the sorbent 20 is saturated with enriched vapour which condenses on the surface of the sorbent 20. The vapour connection 10 to the superheating chamber 16 remains closed in this phase. In a subsequent phase, only the vapour connection 10 to the superheating chamber 16 is opened, and the other vapour connection 10 to the supercooling chamber 15 is closed again. Pure fluid 6 is now evaporated again from the surface of the sorbent 20 amid the supply of heat and is brought through the vapour connection 10 to the vapour space 4 of the superheating chamber 16, where it again condenses on the finely spayed droplets of a lower temperature and is finally captured in the container.

Figure 3A:
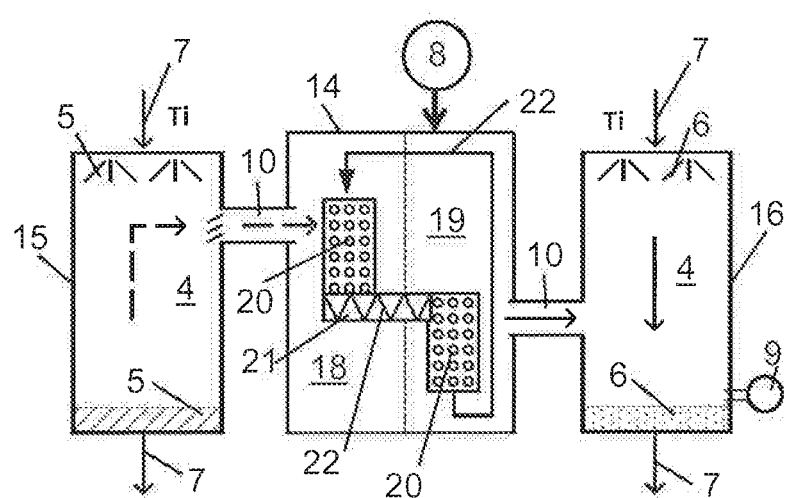
FIGS. 3a-d aggregation devices, designed as a) sorption chamber, operating continuously; b) sorption chamber, operating discontinuously; c) compressor/vacuum pump; d) jet nozzle.

A preferred arrangement with a sorbent 20 is represented in FIG. 3a. In this arrangement, the aggregation device 14 in each case comprises a separate sorption chamber 18 and desorption chamber 19, wherein both are connected to one another by way of at least one connecting channel 21. Transport device 22 is provided for the forward and return transport of the sorbent 20 between the sorption chamber 18 and the desorption chamber 19. Such an arrangement can operate in a continuous manner, by way of sorbent 20 being transported through the connecting channel 21 to and from between the sorption chamber 18 and the desorption chamber 19, in portions or in a trickling manner, depending on the degree of saturation.

In an improved arrangement, the sorption chamber 18 and the desorption chamber 19 are connected to one another by way of at least two connecting channels 21, which on use are constantly filled with trickling-through sorbent 20 in a sealed manner. A stepless sorption and desorption process can thus be carried out with the help of transport devices 21, wherein the sorbent 20 passes the sorption chamber 18 and the desorption chamber 10 in a circulation or circuit.

Figure 3B:
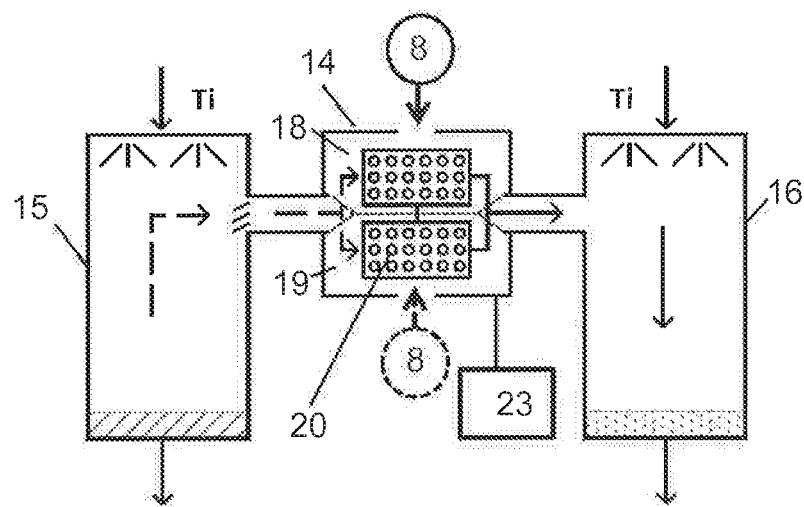

On the other hand, as is represented in FIG. 3b, a sorption process and desorption process can be carried out in each case in an alternating manner in the sorption chamber and the desorption chamber 18, 19. For this, the functions of the sorption chamber 18 and of the desorption chamber 19 are periodically exchanged with the help of a control device 23, by way of the control device 23 being which is able to alternatingly connect the vapour connections 10 to the supercooling chamber 15 or to the superheating chamber 16, to the respective sorption chamber 18 or desorption chamber 19. The energy source 8 is always connected to the respective desorption chamber 19.

On saturation of the sorbent 20 in the sorption chamber 18 and with the complete drying of the sorbent 20 in the desorption chamber 19, both vapour connections 10 are connected to the respective other chambers 18, 19 so that these change their functions. The sorbent 20 remains in the same chamber 18, 19 in each case, and no transport devices 22 are necessary. The energy source 8 is always connected to the respective desorption chamber 19. The control device 23 permits the stepped sorption and desorption, by way of alternating the respective accesses of the vapour connection 10.

The sorbent 20 can be a solid sorbent for example such as zeolite or silica gel, or in the case of a fluid absorbent, for example ammonia or lithium bromide. A gaseous sorbent can also be applied in principle.

Figure 3C:
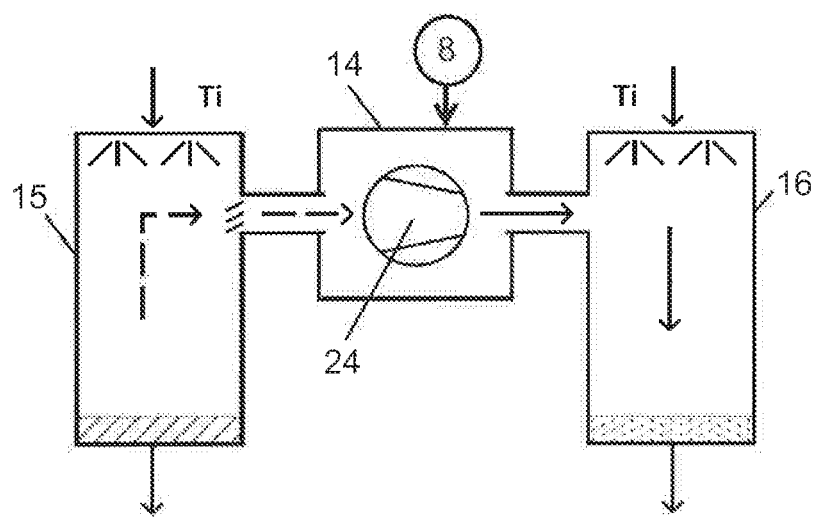
Figure 3D:
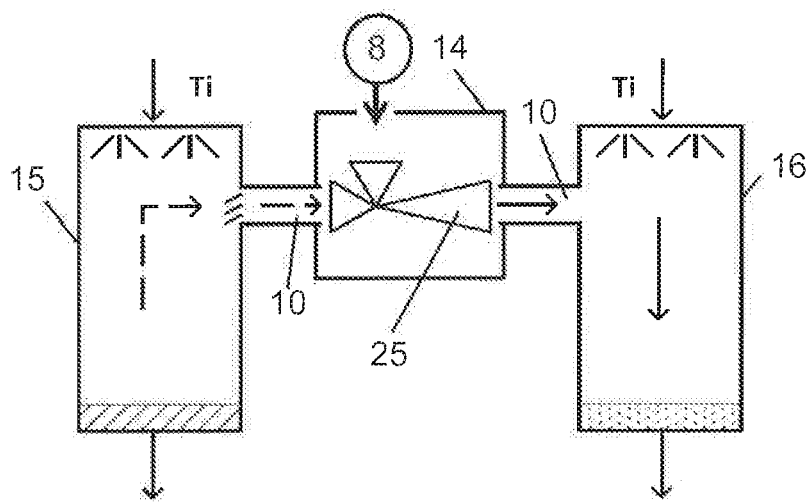

The LTD facility 1 can be designed with an aggregation device 14 in the form of a compressor or a vacuum pump (FIG. 3c) or in the form of a jet nozzle (FIG. 3d), in two alternative embodiments according to FIGS. 3c and 3d, for producing a vacuum in the supercooling chamber 15 and an overpressure in the superheating chamber 16. Vapour is sucked out of the supercooling chamber 15 and brought into the superheating chamber 18, amid the simultaneous cooling of the supercooling chamber 15 and heating of the superheating chamber 16, with each of the mentioned embodiments of the aggregation device 14.

In all these embodiments, the necessary temperature difference for the complete LTD facility is produced centrally in the aggregation device 14. This reduces thermal losses which necessarily arise when the heating and cooling is produced separately, for example by way of heaters, fans or heat exchangers.

The LTD facility 1 according to the invention preferably comprises a suction device 9 for sucking away non-condensable gases at the end of the condensation process in each condenser 3 and in the superheating chamber 16. This suction device 9, when necessary is put into operation as soon as the pressure in a chamber exceeds the saturation pressure of the present vapour by more than a predefined value, which is only a few percent.

A feed of mixed fluid 5, a discharge of a pure fluid 6 as well as a discharge of brine (concentrated solution) 13 having a higher concentration of salt and/or other impurities/undesired substances than the feed of mixed fluid 5, are envisaged for the operation of the LTD facility 1.

Figure 4:
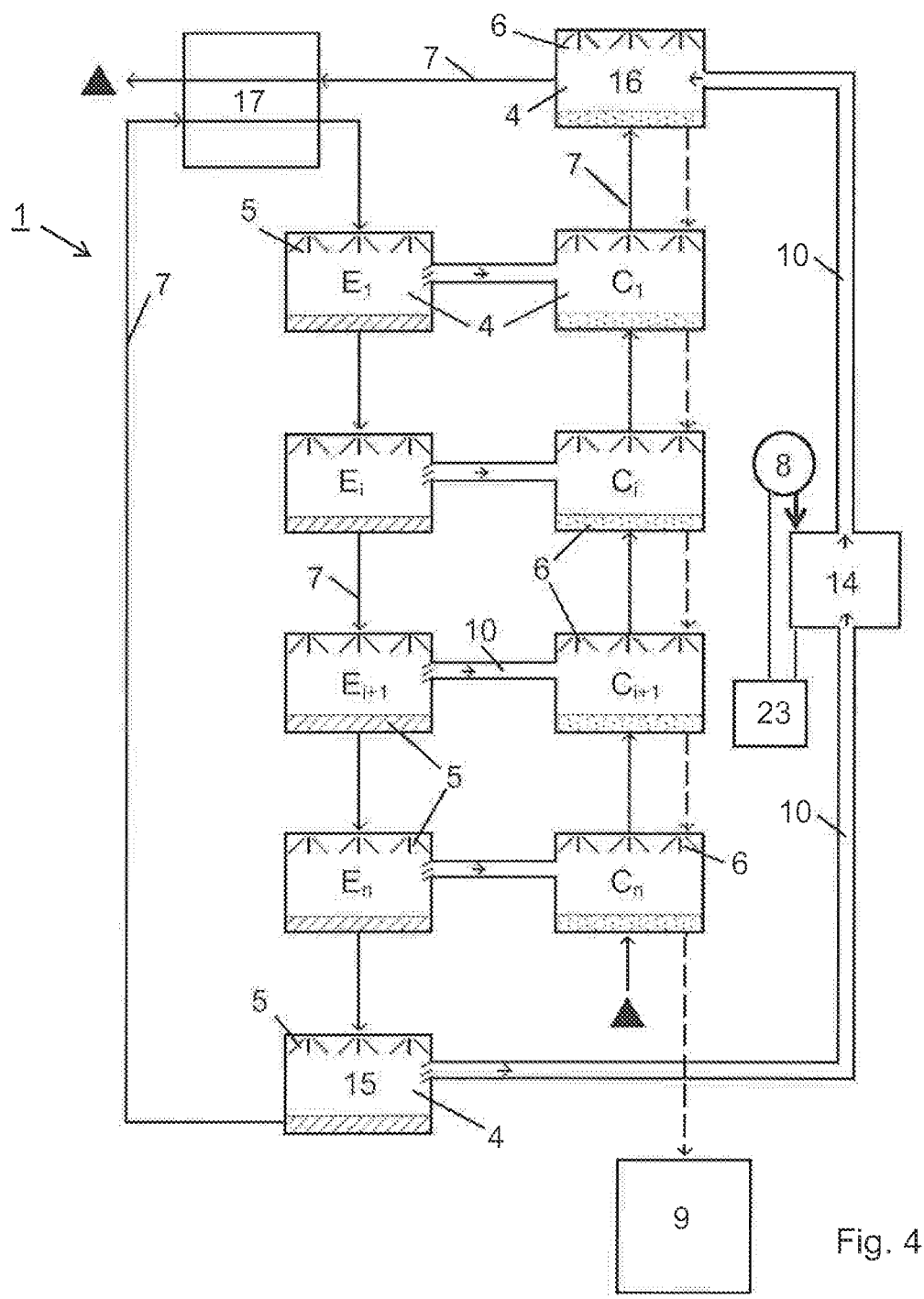
FIG. 4 a schematic representation of a multi-stage LTD facility according to the invention.

According to FIG. 4, the LTD facility 1 according to the invention in particular can comprise a multistage distillation facility of different mean temperatures $T_i$, with i=1, 2, . . . n, with n stages. With such an LTD facility 1, all evaporators 2, here indicated at $E_i$, respectively all condensers 3, here indicated at $C_i$, of the respective different stages i are connected in oppositely running directions into a circuit by way of conduits 7, as already represented and described in FIG. 1b. A representation of the connection between the heat exchanger 17 and the coolest condenser $C_n$ have been done away with for the purpose of a better overview, and such are represented symbolised by two triangles. The dashed line leading to the suction device 9 schematically indicates the suction of non-condensable gases at the end of one or several condensation paths by the suction device 9.

The supercooling chamber 15 is arranged at the end of the evaporator circuit, i.e. subsequently to the coolest evaporator $E_n$, in the same manner as if it were to be a further evaporator E. Moreover, the superheating chamber 16 is arranged at the end of the condenser circuit, i.e. subsequently to the warmest condenser $C_1$, in the same manner as it were to be a further condenser C. The aggregation device 14 is arranged between the supercooling chamber 15 and the superheating chamber 16, and this device is connected to these chambers by way of vapour connections 10, as already been specified. A control device 23 controls the energy feed by the energy source 8 and the aggregation device 14, in accordance with the requirements.

In contrast to all evaporator-condenser pairs $E_i$, $C_i$, i=1 . . . n, whose vapour spaces 4 are connected to one another in each case and thus have the same mean temperature Ti, the temperatures of the vapour spaces 4 of the supercooling chamber 15 and of the superheating chamber 16 and thus of the fluids which are captured therein have the greatest difference of the complete facility. The fluid which are let into these two chambers 15, 16, with the multi-stage method already originate from the coldest evaporator $E_n$ and the warmest condenser $C_1$, but their temperature difference is increased yet again by the aggregation device 14. The sole energy feed or input for the creating the necessary temperature difference of the various evaporator and condenser stages is introduced into the vapour spaces of the supercooling chamber 15 and of the superheating chamber 16 by way of the aggregation device 14.

The representation in FIG. 4 is to be understood as a functional schematic representation and not as a spatially optimised specification of the arrangement. In particular, with regard to the conduits 7 in the condenser circuit, the leading of the run-in upwards in each case and the leading of the run-out from below away from the chambers C has being omitted, so that this representation remains clear. On the one hand, it is advantageous if captured, mixed fluid 5 from the evaporator $E_n$ of the coolest stage can be brought or spayed into the supercooling chamber 15, and the captured pure fluid from the condenser 3 of the warmest stage $C_1$ can be spayed into the superheating chamber 16. On the other hand, it is also advantageous if pure fluid 6 from the superheating chamber and which is cooled in the heat exchanger 17 can be sprayed in at the entry into the coolest condenser $C_n$, and the mixed fluid 5 from the supercooling chamber 15 and which is heated in the heat exchanger 17 can be spayed in or brought in at the entry into the warmest evaporator $E_1$.

Part-flows (not represented) from different condensers C or evaporators E, in conduits 7 or vapour conduits 10 can moreover also be connected to feeding or leading-away conduits 7 and/or vapour conduits 10 of the aggregation device 14 and/or of the heat exchanger 17, in order to achieve further thermal improvements, wherein part-flows can also be fed and/or led away within the heat exchanger 17. Smaller temperature adaptations in individual condensers C and/or evaporators E can be effected by way of this, without external heat being required for this and without heat being lost to the surroundings.

In a further improved LTD facility, which is not represented, further vapour connections 10 of vapour spaces 4 of different stages are connected by conduits 7 to condensers $C_i$ of other stages with lower means temperatures, for increasing the pressure in the respective conduits 7. The energy consumption for producing the required pressure differences can also be reduced by way of this, additionally to the reduction of the energy effort for producing temperature differences. The LTD facility 1 according to the invention and which is described here can be combined with further optimisation methods without any problem.

In particular, the heat which is produced in the aggregation device 14 can be distributed in part-flows into several evaporators 2 and/or condensers 3 of different stages $E_i$, $C_i$ as well as into the superheating chamber 16. This can be achieved for example by way of further heat exchangers which are arranged running oppositely between different conduits 7 being provided additionally to the mentioned heat exchanger 17.

LIST OF REFERENCE NUMERALS

1 low-temperature distillation facility (LTD facility)
2 E, $E_i$ evaporator
3 C, $C_i$ condenser
4 vapour space
5 mixed fluid
6 pure fluid
7 conduits, fluid conduits
8 energy source, heat sink
9 suction device, V
10 vapour connections
11 supply container of mixed fluid
12 end container with pure fluid, distillate
13 brine
14 aggregation device
15 supercooling chamber
16 superheating chamber
17 heat exchanger
18 sorption chamber
19 desorption chamber
20 sorbent
21 connecting channel
22 transport device
23 control device
24 compressor, vacuum pump
25 jet nozzle

The invention claimed is:
1. A low-temperature distillation facility (LTD) for distilling a mixed fluid into a pure fluid, the LTD comprising:
a first stage configured for operation at a mean temperature $T_i$ and that includes:
an evaporator with a vapour space and with a warmer mixed fluid at a temperature $T_i+\Delta T$ which can be introduced to the evaporator, wherein $\Delta T$ is a temperature difference relative to the mean temperature $T_i$, a condenser with a vapour space and with a cooler pure fluid at a temperature $T_i-\Delta T$ which can be sprayed into the condenser, a vapour connection that connects the vapour space of the evaporator and the vapour space of the condenser to form a common vapour space, wherein the vapour connection is configured such that the pressure and the temperature in the vapour connection can equalise at all times in an unhindered manner;

a supercooling chamber defining a vapour space and connected to the evaporator, the supercooling chamber being configured for conducting captured mixed fluid from the evaporator into the supercooling chamber to form a cold captured mixed fluid;

a superheating chamber defining a vapour space and connected to the condenser, the superheating chamber being configured for conducting captured pure fluid from the condenser to be sprayed into the superheating chamber to form a hot captured pure fluid;

an aggregation device defining an entry side connected to the vapour space of the supercooling chamber, the aggregation device further defining an exit side connected to the vapour space of the superheating chamber;

an energy source connected to the aggregation device and configured for cooling the temperature in the supercooling chamber and for heating the temperature in the superheating chamber so as to drive a vapour to flow from the supercooling chamber to the superheating chamber via the aggregation device; and a heat exchanger having a cool side connected to the supercooling chamber and a warm side connected to the superheating chamber, the heat exchanger being configured for cooling the hot captured pure fluid from the superheating chamber before being introduced into the condenser as the cooler pure fluid at the temperature $T_i-\Delta T$, the heat exchanger being configured for heating the cold captured mixed fluid from the supercooling chamber before being introduced into the evaporator as the warmer pure fluid at the temperature $T_i-\Delta T$.

2. The LTD facility according to claim 1, wherein the aggregation device comprises a sorption chamber and/or a desorption chamber, with a sorbent, wherein at least temporarily, vapour from the vapour space of the supercooling chamber can be condensed and sorbed in the sorbent in the sorption chamber, and at least temporarily, whilst inputting energy, pure fluid can be desorbed out of the sorbent in the sorption chamber and into the vapour that is driven to flow to the superheating chamber.

3. The LTD facility according to claim 1, further comprising a sorption chamber and a desorption chamber, a first connecting channel connecting the sorption chamber to the desorption chamber, and transport devices disposed in the connection channel and configured for the forward and return transport of the sorbent between the sorption chamber and the desorption chamber.

4. The LTD facility according to claim 3, wherein a sorption process and a desorption process can be carried out in the sorption chamber and the desorption chamber in an alternating manner.

5. The LTD facility according to claim 3, wherein the sorption chamber and the desorption chamber are connected to one another byway of a second connecting channel, the first and second connecting channels, which in use are constantly sealingly filled with the trickling-through sorbent, so that a stepless sorption and desorption process can be carried out with the help of the transport devices.

6. The LTD facility according to claim 3, further comprising a control device which periodically exchanges the functions of the sorption chamber and desorption chamber for permitting a stepped sorption and desorption by way of the control device, which is configured to alternatingly connect the supercooling chamber or the superheating chamber to the sorption chamber or desorption chamber, respectively, via the vapour connection and wherein the energy source is always connected to the functioning desorption chamber.

7. The LTD facility according to claim 2, wherein the sorbent is a zeolite, silica gel, ammonia or lithium bromide.

8. The LTD facility according to claim 1, wherein the aggregation device comprises a compressor, a vacuum pump, or spray nozzle for producing a vacuum in the supercooling chamber and an overpressure in the superheating chamber, by which means vapour is sucked out of the supercooling chamber and is brought into the superheating chamber, amid the simultaneous cooling of the supercooling chamber and heating of the superheating chamber.

9. The LTD facility according to claim 1, further comprising: a feed conduit disposed between the heat exchanger and the evaporator and configured to feed the heated cold captured mixed fluid into the evaporator, a first discharge conduit disposed between the heat exchanger and the condenser and configured to discharge pure fluid, as well as a second discharge conduit disposed between the heat exchanger and the evaporator and configured to discharge brine.

10. A multi-stage (i=1 through i=n) low-temperature distillation facility (LTD) for distilling a mixed fluid into a pure fluid, the LTD comprising:

a plurality of successive stages (i=1, i=2, i=3, * * * i=n), wherein each respective stage is configured for operation at a mean temperature $T_i$ and wherein each immediately successive stage's mean temperature $T_{i+1}$ is lower than the respective immediately previous stage's temperature $T_i$, each respective stage including:

a respective evaporator $E_i$ with a vapour space and with a warmer mixed fluid at a temperature $T_i-\Delta T$ which can be introduced to the respective evaporator $E_i$, wherein $\Delta T$ is a temperature difference relative to the mean temperature $T_i$, a respective condenser $C_i$ with a vapour space and with a cooler pure fluid at a temperature $T_i-\Delta T$ which can be sprayed into the respective condenser $C_i$, a respective vapour connection that connects the vapour space of the respective evaporator $E_i$ and the vapour space of the respective condenser $C_i$, wherein the respective vapour connection is configured such that the pressure and the temperature in the respective vapour connection can equalise at all times in an unhindered manner;

a supercooling chamber defining a vapour space and an inlet connected to a last successive evaporator $E_n$ in the plurality of stages, the supercooling chamber being configured for conducting a captured mixed fluid from the last successive evaporator $E_n$ in the plurality of stages into the supercooling chamber to form a cold captured mixed fluid;

a heat exchanger defining a relatively warmer conduit and a relatively cooler conduit, wherein the relatively cooler conduit is connected to the supercooling chamber and to a first successive evaporator $E_1$ in the plurality of stages, wherein the relatively cooler conduit is configured to receive the cold captured mixed fluid from the supercooling chamber and supply a heated mixed fluid to the first successive evaporator $E_1$ in the plurality of stages, a superheating chamber defining a vapour space and an inlet connected to a first successive condenser $C_1$ in the plurality of stages, the superheating chamber being configured for conducting a captured pure fluid from the first successive condenser $C_1$ in the plurality of stages into the superheating chamber to form a hot captured pure fluid, and wherein the relatively warmer conduit of the heat exchanger is connected to the superheating chamber and configured to receive the hot captured pure fluid from the superheating chamber and supply a cooled pure fluid to the last successive condenser $C_n$ in the plurality of stages;

an aggregation device defining an entry side connected to the vapour space of the supercooling chamber, the aggregation device further defining an exit side connected to the vapour space of the superheating chamber;

an energy source connected to the aggregation device and configured for cooling vapour entering the entry side of the aggregation device from the supercooling chamber and for heating vapour exiting the exit side of the aggregation device connected to the superheating chamber in order to drive vapour to flow from the supercooling chamber to the superheating chamber via the aggregation device; and wherein the heat exchanger is configured for cooling the hot captured pure fluid from the superheating chamber in the warmer conduit to the cooled pure fluid before the cooled pure fluid is introduced into the last successive condenser $C_n$ in the plurality of stages, wherein the heat exchanger is configured for heating the cold captured mixed fluid from the supercooling chamber in the cooler conduit to the heated mixed fluid before being introduced into the first successive evaporator $E_1$ in the plurality of stages.

11. The LTD facility according to claim 10, further comprising a suction device for sucking away non-condensable gases at the end of a condensation process in each condenser and in the superheating chamber.

12. The LTD facility according to claim 10, wherein all the evaporators $E_i$ and all the condensers $C_i$ are connected in opposite directions into a circuit by way of conduits.

13. The LTD facility according to claim 12, wherein the heat which is produced in the aggregation device is distributed into several evaporators $E_i$ of different stages.

14. The LTD facility according to claim 12, wherein captured mixed fluid can be brought out of the evaporator $E_n$ of the coolest stage into the supercooling chamber, and wherein the captured pure fluid from the condenser $C_1$ of the warmest stage can be sprayed into the superheating chamber.

15. The LTD facility according to claim 12, wherein the pure fluid from the superheating chamber and cooled in the heat exchanger can be sprayed in at the entry into the coolest condenser $C_n$, and/or the mixed fluid from the supercooling chamber and heated in the heat exchanger can be brought in at an entry into the warmest evaporator $E_1$.

16. The LTD facility according to claim 10, wherein the heat produced in the aggregation device is distributed in part-flows into several evaporators $E_i$ and/or condensers $C_i$ of different stages as well as into the superheating chamber.

* * * * *